(No Model.) 2 Sheets—Sheet 1.
S. R. SKOV.
STREET CAR TRUCK.
No. 553,268. Patented Jan. 21, 1896.
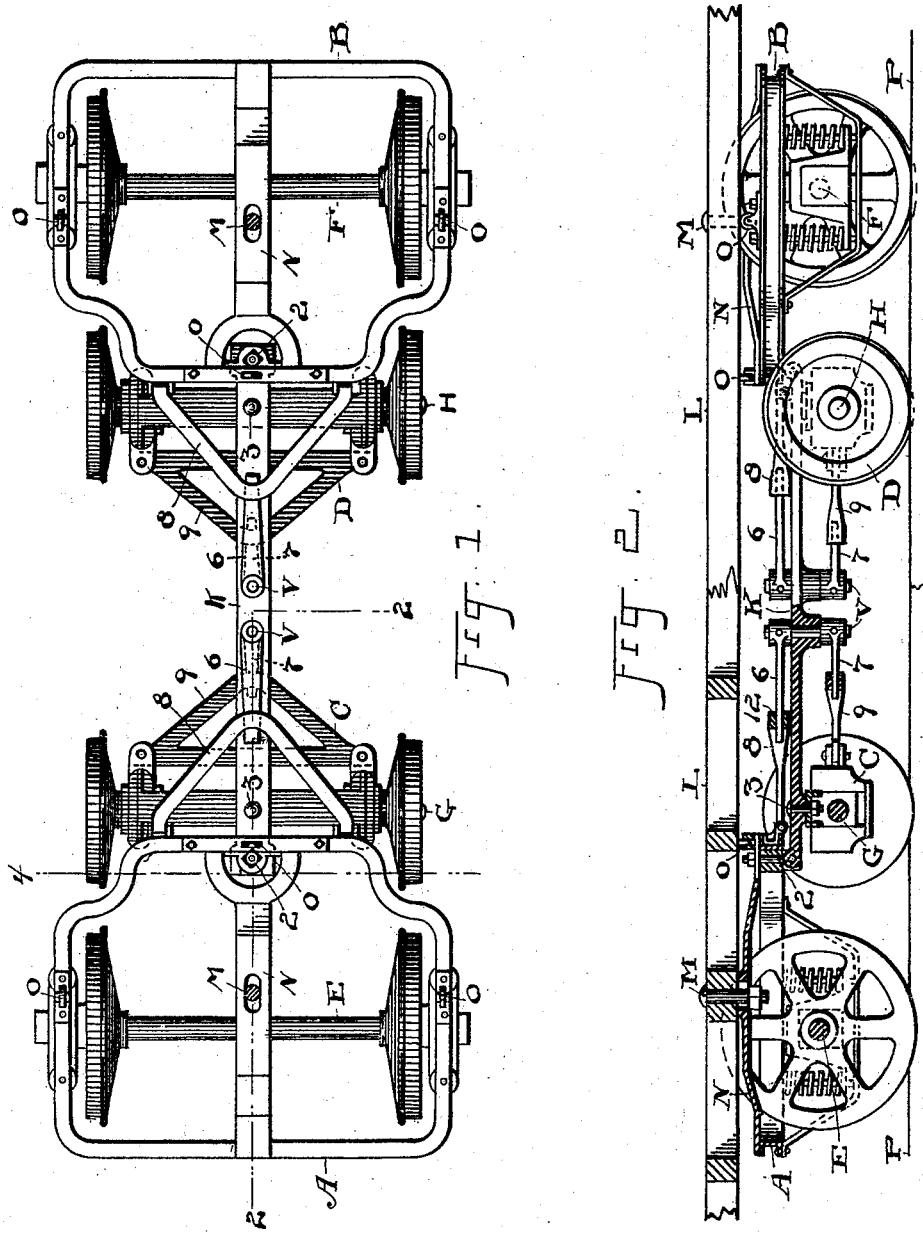
ATTEST.
R. B. Moser.
G. S. Schaeffer.
INVENTOR.
Soren Robertson Skov.
BY H. J. Fisher ATTORNEY (No Model.) 2 Sheets—Sheet 2.
S. R. SKOV.
STREET CAR TRUCK.
No. 553,268. Patented Jan. 21, 1896.
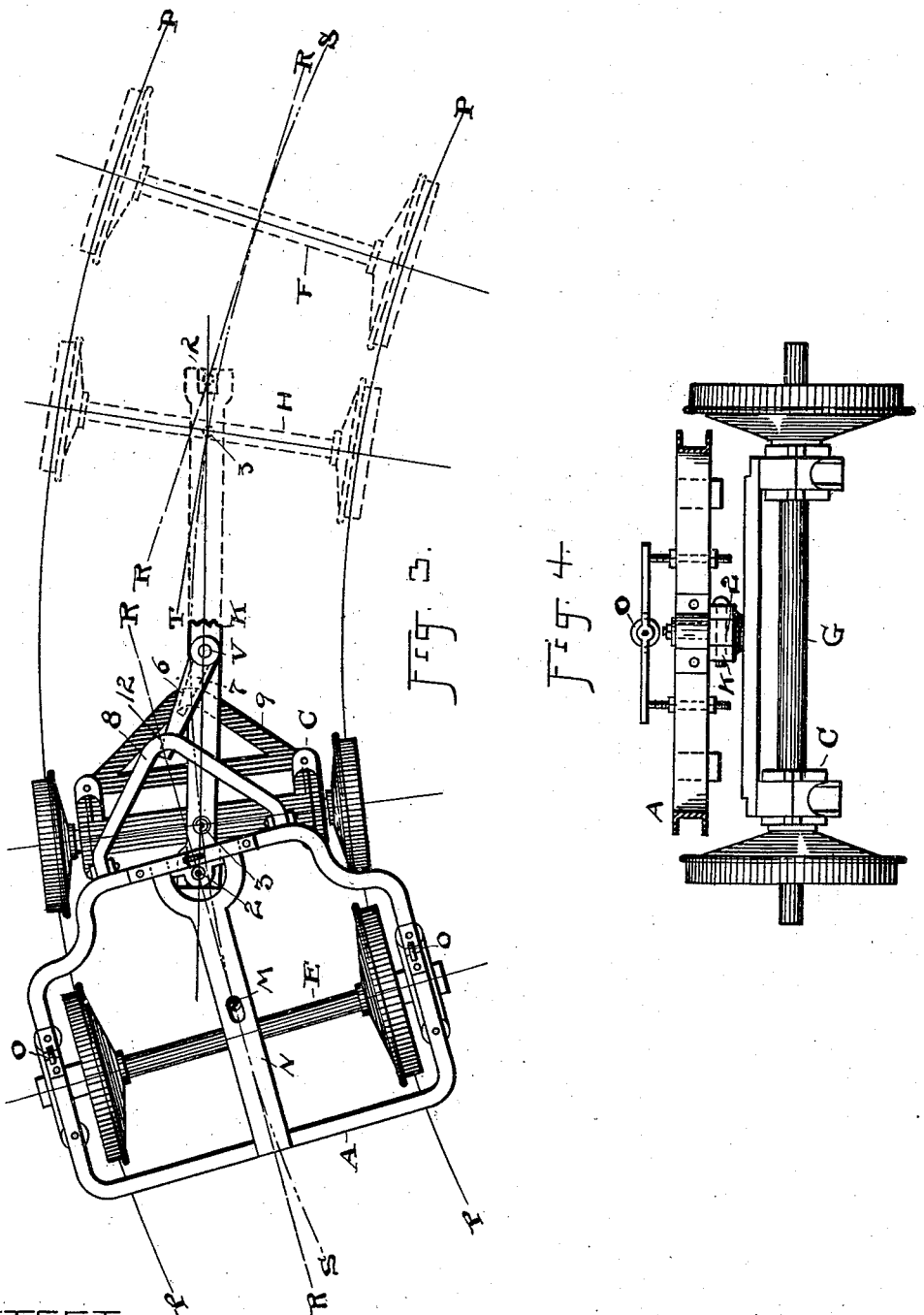
ATTEST.
P. B. Moser.
G. S. Schauffer
INVENTOR
Soren Robertson Skov.
BY H. T. Fisher ATTORNEY

UNITED STATES PATENT OFFICE.

SOREN ROBERTSON SKOV, OF CLEVELAND, OHIO.

STREET-CAR TRUCK.

SPECIFICATION forming part of Letters Patent No. 553,268, dated January 21, 1896.

Application filed August 9, 1894. Serial No. 519,810. (No model.)

*To all whom it may concern:*

Be it known that I, SOREN ROBERTSON SKOV, a citizen of the United States, residing at Cleveland, in the county of Cuyahoga and State of Ohio, have invented certain new and useful Improvements in Street-Car Trucks; and I do hereby declare that the following is a full, clear, and exact description of the invention, which will enable others skilled in the art to which it appertains to make and use the same.

My invention relates to improvements in street-car trucks; and the object of the invention is to produce a construction, combination and arrangement of carrying-wheels and individual pivoted trucks therefor which will cause each set of wheels to be automatically adjusted or turned to the curve of the track over which they are moving, and thus avoid the usual friction, strain and wear which the trucks in common use unavoidably incur.

It is well known that the old-fashioned car-trucks with two axles turning in fixed bearings and having no means whatever to adapt them to curves or turns in the track are illy adapted to the present large and heavy motor-car, and that they are a constant source of strain and danger to the motor as well as to the car, and the direct cause of much expensive wear and tear on the operating mechanism. Many attempts have been made to overcome these difficulties by introducing flexibility or self-adjustment or other automatic accommodations into the running-gear or truck of the car, and I am aware that cars have been built and used having such purpose and mechanism incorporated therein; but I am not aware that any one has ever made, known or used car-trucks constructed or operating on the principle of the invention herein shown and described. My construction involves the usual carrying-wheels and an additional set of combined guiding and carrying wheels for each original set of wheels, and these several sets of wheels are so arranged in separate but associated and connected trucks that they are interdependent and help one another to take and keep the curve of the track on which they are moving without friction on the flange of the wheels or other strain arising from the fact that a curve is being made. In other words, the connecting and guiding mechanism of the trucks is such that all the trucks are brought into exact relationship at
each and every point of the curve with the radial line of that point, as clearly seen in Fig. 3 and hereinafter more fully described. Each axle therefore constantly remains at right angles to the point of the track on which it finds itself for the time being, and it keeps itself in this alignment regardless of the other axles before or behind, and all the axles do the same thing. The mechanism uniting the trucks in which the several axles are mounted is adapted to exactly work out these results, as will appear in the detailed description of the invention.

In the accompanying drawings, Figure 1 is a plan view of a combination of car-trucks embodying my invention. Fig. 2 is a central sectional elevation on line 2 2, Fig. 1. Fig. 3 is a diagrammatic view of a curved track, showing certain radial lines with a common center, and a plan view of a pair of associated trucks belonging to one end of a car, and illustrating the position of said trucks in relation to one another and of the associated parts when on the curve, as hereinafter more fully described. Fig. 4 is an enlarged sectional elevation on line 4 4, Fig. 1, looking to the right, and showing the smaller truck and wheels.

The invention herein comprises two end trucks A and B and two intermediate trucks C and D, respectively. The trucks A and B, and the trucks C and D are exactly alike in construction, combination and operation. Each truck A and B has an axle E and wheels F fixed thereon, and each truck C and D has an axle G and wheels H fixed thereon. The trucks A and C and B and D, respectively, have immediate and intimate dependence and relationship one upon the other through their connecting parts, and the groups or pairs of trucks A and C and B and D, respectively, have a remote dependence and relationship through the reach K by which they are all connected.

The car-body represented here by the frame L is supported primarily upon each of the truck-frames A and B through the central vertical coupling pin or bolt M, which is engaged through a strong and heavy plate or bar N lengthwise and centrally of the middle of the truck, and the car-frame or body rests at its sides and middle upon the three rollers or wheels O on the truck-frames A and B. The bolt M forms the pivot-point of the trucks A and B with respect to the car-body, and the weight of said body is distributed uniformly upon the wheels or rollers O. Of course I do not limit myself to this particular construction or means for carrying the weight of the car upon the truck, and I may vary the same without departing from the spirit of the invention. I do, however, require a horizontal pivot for the car-truck with respect to the body of the car, so that the truck may take the radius of a track whatever it may be and make an easy turn regardless of the position for the time being of the car-body.

It will be noticed in Fig. 1 that the reach K has what may be termed a "universal pivot" at 2 centrally with each of the trucks A and B—that is, up and down and horizontally—and that it likewise has a pivoted connection at 3 with the trucks C and D, respectively, immediately over the middle of their axle G. These two pivot-points 2 and 3 of the two associated trucks are close to one another, and need to be, in order that the connecting mechanism may operate to adapt the trucks to the curve. Now having the several trucks pivoted on the reach K, as shown, and the said reach being rigid at all points, it is clear that, on a curve, the reach can be exactly central with respect to the rails P or sides of the track at only two points, and that these points are at 3, the pivot at the smaller trucks. This throws the pivot 2 of the larger trucks A and B to the outside of the center of the track, as clearly seen in diagram Fig. 3. This point 2, however, remains at right angles to the axis of outer axle E, as seen by straight line R, which is necessary to keep said axle on its radial line S. The position of axle G in the curve, on the other hand, necessitates that its middle or central point 3 be brought in to the exact center of the curve, as shown in the diagram by the right-angle line T.

It is desirable to keep the two trucks in each pair in this relation till the curve is traversed, and to do this it is necessary to make them equalizers for one another. Neither can operate alone, and each must be governed according to its place and relation to the other on the curve. To the end that such governing or guiding of one by the other may occur, I establish a common pivot-point near the center of the reach for each set of trucks, and on the pivot-pin V therein fix rigidly two leaves 6 and 7 above and below the reach, respectively, which engage with guide-tongues or extensions 8 and 9 connected with the respective trucks in a pair and with the levers 6 and 7. The connection between levers 6 and 7 and tongues 8 and 9 is such as to allow free play between them laterally and at the same time insure positive and immediate lateral action when action should occur. As here shown, the levers 6 and 7 enter horizontal slots in the tongues 8 and 9 and extend through far enough to prevent disengagement. It will be understood that in this construction and operation the presumption is present all the time that the natural tendency of the wheels and trucks is to remain on the track. However, I have arranged to so unite the trucks at each end that each will operate to keep the other on its radial line regardless of the natural tendency of the wheels. To do this in the arrangement here shown with a common pivot-point V on the reach and the different radii of the axles E and G, owing to the difference in distance from this point V, I necessarily must use levers 6 and 7 of different lengths. This latter difference is determined by the distance the axles E and G respectively sustain from point V, and the nearer axle of course takes the shorter lever. In this guiding of the pairs of trucks the reach K has of course much to do. Thus, referring to Fig. 3, it will be seen that the truck A is directly connected to the end of the reach at pivot-point 2 and that the reach is pivoted on the truck C just in front thereof at 3. Now, assuming that the car is traveling toward the right in Fig. 3, the truck A is not only turned to the radial line there shown by reason of the pivot-point 3 being on the center of the track which carries its own pivot off the center, as seen at the right of said figure, but it is prevented from turning in either direction from that angle and from taking a greater angle by reason of the reach being confined at 3 to the truck C. This fixes the relation of the parts at this point. Now, going forward again to the levers 6 and 7, we find that there is here interplay or equalization of movement between said levers in further guiding said trucks, and that the point 12, where the lever 6 and tongue 8 of the rear truck meet, being outside of the middle of the track, as shown, it will in like manner turn lever 7 of truck C to the same angle, and thus throw the axle G and its wheels into the right angle to the track. The truck C will therefore be guided through its lever 7 at the angle thus established, and will be held there through the lever 6 and the tongue 8 of the larger truck. In this way I am enabled to hold each axle upon its radial line when a curve is being turned and to hold the axles of the inner trucks upon corresponding lines and the axles of the outer trucks upon corresponding lines, the lines of inner and outer trucks, however, differing, as clearly shown in Fig. 3.

It will be noticed by the arrangement herein shown that a portion of the weight of the car necessarily comes upon the smaller inner trucks C and D, so that the weight is distributed between the four trucks of the car. The larger part, however, of course comes upon the outer trucks. The inner trucks, therefore, serve the double purpose of carrying a portion of the weight and of co-operating guides for the other trucks in making curves. Upon a straight track the position and relation of the parts is as clearly seen in Fig. 1, and all the central pivot-points are in line with each other, and the trucks are held in that line until a curve is reached.

It will be understood that all, or nearly all, of the details herein shown and described may be more or less modified as to construction, and in some cases as to arrangement, and not depart from the invention.

It will further be understood that each set of trucks at the ends of the car respectively works exactly like the other set, and that in describing and claiming one set the other is covered also.

The construction hereinbefore described is not only adapted to overcome friction and strain in making a curve, but it is also adapted to make a much shorter curve than is possible with the old-fashioned truck, and especially to make a shorter curve with a longer car-body and a wider separation of the car-axles than is possible with the old-fashioned car. This is a material and important advantage, especially in cities in which the track makes short curves around the corners of narrow streets, and it adapts the long-bodied modern car to use in streets of this kind where it could not possibly go if the old rigid truck were used. It will also be noticed that the truck mechanism shown and described herein is wholly independent of the car-body in so far as its operation is concerned, and that it will operate just the same and just as well without any car-body whatever as with one.

In making a turn on the road and having the reach constructed as herein, with the car-body pivoted at M on the end trucks, there needs to be slight lateral flexibility in the connections to accommodate the trucks and their connecting mechanism to the curve of the road, and there must either be provision made in the reach for a slight elongation thereof or room to accomplish the same thing at some other point. Such room or provision may be made in the plate N at the point where the bolt M passes through, making the hole in said plate slightly oblong, as shown, to enable the lengthwise movement to take place at that point.

What I claim is—

1. The car trucks described, consisting of the two outer main trucks and two inner auxiliary trucks, a reach to which each of the four trucks is pivoted, and a separate lever for each of said several trucks pivoted on said reach above and below the same respectively, substantially as set forth.

2. In street cars, the combination of two main trucks and two auxiliary intermediate trucks, a reach and pivot connections on each truck with said reach, a pivot bolt on the reach for each set of trucks and a lever for each truck in the pair rigid with said bolt, the inner trucks connected with the lower end of the pivot bolt and the outer trucks connected with the upper ends thereof above the reach, substantially as set forth.

3. In cars, a pair of main trucks and a pair of inner auxiliary trucks and a reach common to all said trucks, each of said main truck frames having pivotal connection with each adjacent inner truck, and means on said several truck frames to rest the weight of the car body on the main and inner trucks, substantially as set forth.

4. In a car, four several trucks pivoted in pairs and consisting each of a main truck and an auxiliary truck, a reach, and a separate tongue for each truck pivoted on said reach, and means on said several trucks to support the car body in combination with the car body, substantially as set forth.

5. Four trucks arranged in pairs and a reach rigid throughout its length and having said trucks pivoted thereon at different points, the outer trucks secured to the ends of the reach and the inner trucks secured thereto immediately over the centers of their axle and near the end of the reach, substantially as set forth.

6. In car trucks, a reach, a pair of trucks arranged one behind the other and the inner truck pivoted to the reach centrally over its axle and the outer truck pivoted on the end of the reach at its front end forward of the axle, substantially as set forth.

7. A car truck having a truck frame extending outward beyond the wheels therein, and a reach to which said frame is pivoted through its outwardly extending portion and a second truck pivoted on said reach directly over its axle center and adjacent to the pivot point of the other truck, substantially as set forth.

8. In cars, a main truck and an auxiliary truck for each end of the car and a common reach with which each of said trucks has a plurality of pivotal connections, and means on said trucks to support the weight of the car body upon all said several trucks, substantially as set forth.

9. In street cars, four several trucks connected in pairs and a reach common to all said trucks, the trucks of each pair pivoted on the reach at one end thereof and the outer truck pivoted outside of the inner truck, a tongue on each truck and a lever for said tongue, said levers supported on a common pivot bolt in the reach and the lever for the outer truck longer than the lever for the inner truck, subtially as set forth.

10. The trucks in pairs substantially as described and the reach to which the trucks are each separately pivoted, in combination with a pivot bolt—V—on the reach for each pair of trucks, and a lever for each truck rigid with said bolt, and tongues on said trucks in which said levers operate, substantially as set forth.

Witness my hand to the foregoing specification.

SOREN ROBERTSON SKOV.

Witnesses:
H. T. FISHER,
GEORGIA SCHAEFFER.